(12) United States Patent
Del-Gallo et al.

(10) Patent No.: US 7,846,236 B2
(45) Date of Patent: Dec. 7, 2010

(54) METHOD FOR PRODUCING OXYGEN, FROM AIR, PARTICULARLY USING AN ELECTROCHEMICAL CELL WITH CERAMIC MEMBRANE, WITH CONTROL MEANS FOR CONTINUOUS PRODUCTION

(75) Inventors: Pascal Del-Gallo, Dourdan (FR); Guylaine Gouriou, Voisins le Bretonneux (FR)

(73) Assignee: L'Air Liquide Societe Anonyme pour l'Etude et l'Exploitation des Procedes Georges Claude, Paris (FR)

( * ) Notice: Subject to any disclaimer, the term of this patent is extended or adjusted under 35 U.S.C. 154(b) by 232 days.

(21) Appl. No.: 12/094,651

(22) PCT Filed: Nov. 17, 2006

(86) PCT No.: PCT/EP2006/068614

§ 371 (c)(1),
(2), (4) Date: Oct. 13, 2008

(87) PCT Pub. No.: WO2007/060141

PCT Pub. Date: May 31, 2007

(65) Prior Publication Data

US 2009/0031895 A1 Feb. 5, 2009

(30) Foreign Application Priority Data

Nov. 24, 2005 (EP) .................................. 05300962

(51) Int. Cl.
*C01B 13/02* (2006.01)
*B01D 53/22* (2006.01)
*B01D 53/32* (2006.01)

(52) U.S. Cl. .......................... 95/1; 95/22; 95/23; 95/54; 204/157.5

(58) Field of Classification Search ........................ 95/1, 95/19, 22, 23, 54; 128/204.18, 204.21; 204/157.5; 429/30, 40, 41, 44, 46
See application file for complete search history.

(56) References Cited

U.S. PATENT DOCUMENTS

| 4,519,813 | A | 5/1985 | Hagiwara et al. | |
|---|---|---|---|---|
| 5,855,762 | A | 1/1999 | Phillips et al. | |
| 5,917,139 | A * | 6/1999 | Goodell et al. | ................. 96/113 |
| 6,171,371 | B1 | 1/2001 | Derive et al. | |
| 6,352,624 | B1 | 3/2002 | Crome et al. | |
| 6,368,491 | B1 | 4/2002 | Cao et al. | |
| 6,475,657 | B1 * | 11/2002 | Del Gallo et al. | ........... 429/482 |
| 7,300,561 | B2 * | 11/2007 | Chaput et al. | ............... 204/295 |
| 7,399,393 | B2 * | 7/2008 | Chaput et al. | ............... 204/295 |
| 2004/0042944 | A1 | 3/2004 | Sehlin et al. | |
| 2005/0016865 | A1 | 1/2005 | Tsai et al. | |

FOREIGN PATENT DOCUMENTS

EP        0 948 989        10/1999

OTHER PUBLICATIONS

International Search Report for PCT/EP2006/068614, mailed Mar. 2007.

\* cited by examiner

*Primary Examiner*—Frank M Lawrence
(74) *Attorney, Agent, or Firm*—Christopher J. Cronin (57) ABSTRACT

An oxygen generator is controlled to producing oxygen during a period t at a pressure P2 higher than P1, or during a period t' with a flow rate D2 higher than D1, optionally with a pressure P2 higher than P1.

10 Claims, 6 Drawing Sheets

METHOD FOR PRODUCING OXYGEN, FROM AIR, PARTICULARLY USING AN ELECTROCHEMICAL CELL WITH CERAMIC MEMBRANE, WITH CONTROL MEANS FOR CONTINUOUS PRODUCTION

CROSS-REFERENCE TO RELATED APPLICATIONS

This application is a §371 of International PCT Application PCT/EP2006/068614, filed Nov. 17, 2006.

BACKGROUND

The present invention relates to the production of oxygen or an oxygen-enriched gas, pressurized, from air or any other oxygen-lean gas, by using an electrochemical generator of the ionically conducting ceramic membrane type.

Such generators are well known today, and generally comprise one or more electrochemical cells for generating oxygen, each comprising one or more ceramic membranes. In such a generator, each ceramic membrane is heated, by external or built-in heating, to high temperature, and consists of a cathode (deposit or support), an anode (deposit or support) or a solid electrolyte (self-supported ceramic membrane or one supported on the anode or the cathode). Such a membrane (regardless of its shape) is supplied with air from the cathode side. The oxygen molecule dissociates at the cathode (deposit or porous support), the anion ($O_2^-$) diffuses through the solid electrolyte and recombines to form molecular oxygen at the anodic deposit or porous support. On the whole, by introducing atmospheric air at the inlet of such a generator, oxygen is generated that is pure, indeed of very high purity (grade N60, purity above 99.9999%), and optionally pressurized.

Such generators are described, for example, in documents WO 02/058830, WO 01/07149 and WO 02/058829 which can be referred to usefully as required. For example, the ceramic membrane is a solid electrolyte having the formula: $(M_\alpha O_\beta)_{1-x}(R_y O_\delta)_x$ where M is at least one trivalent or tetravalent atom selected from Bi, Ce, Zr, Ga, Th or Hf, $\alpha$ and $\beta$ are such that the $M_\alpha O_\beta$ structure is electrically neutral, R is at least one divalent or trivalent atom selected from Mg, Ca, Ba, Sr, Gd, Sc, Yb, Y, Sm or La, y and $\delta$ are such that the $R_y O_\delta$ structure is electrically neutral, and x is between 0.05 and 0.40, and more particularly between 0.06 and 0.20. Two families of solid electrolytes are conventionally employed: yrittria-stabilized zirconia ($ZrO_2$-$Y_2O_3$, 5-15 wt % $Y_2O_3$), and gadolinium-doped ceria ($CeO_2$—$Gd_2O_3$, so as $Ce_{1.8}Gd_{0.2}O_{2-\delta}$).

For example, each electrode, that is, anode and cathode, is a material with the formula: $M_1 M_2 O_3$ where $M_1$ is one or more atoms selected from La, Ce, Pr, Nd, Pm, Sm, Eu, Gd, Tb, Dy, Ho, Er, Tm, Yb, Lu, Y, Mg, Ca, Sr or Ba, and $M_2$ is one or more atoms selected from Sc, Ti, V, Cr, Mn, Fe, Co, Ni, Cu, or Zn.

The family conventionally employed as an $M_1 M_2 O_3$ type electrode-has a perovskite structure. Materials such as $La_{1-x}Sr_xMnO_{3-\delta}$, $La_{1-x}Sr_xFe_yCo_{1-y}O_{3-\delta}$, etc., can be mentioned as examples of anodic and cathodic materials.

However, the present invention, as described below, is not limited to this type of generator identified above.

The present invention relates more particularly to the production of ultrapure pressurized (1 to 50 bar) oxygen, particularly with a generator as defined above, providing flexibility of pressure and/or flow rate for the user.

Document U.S. Pat. No. 6,368,491 describes a ceramic membrane generator comprising n cells, mounted in parallel. According to the oxygen demand, one to n cells are used. A control system, or controller, is used to control or run the generator, by on/off control of each cell. No system is described for regulating the oxygen pressure.

Document U.S. Pat. No. 6,352,624 describes a ceramic membrane generator producing oxygen at a pressure of up to 138 bar, to which a storage tank is added, the combination being controlled by a control system, or controller, for determining the number of electrochemical cells necessary to reach the fixed oxygen flow rate. The control system does not allow control of the outlet pressure of the oxygen, which is supplied directly by the electrochemical cell or cells employed.

Document U.S. Pat. No. 5,855,762 describes a method for controlling a ceramic membrane generator, in which the electric current supplied to the said membranes depends on a signal indicating the quantity of oxygen produced by the generator and by the level of a tank for storing the oxygen produced. According to this solution, no means are used to control the outlet pressure.

SUMMARY

The invention includes methods to achieve the desired results, as described, but is not limited to the various embodiments disclosed.

It is the object of the present invention, by using an appropriate control system, to be able to adjust the production of oxygen to any high occasional demand, in terms of flow rate and/or pressure, which may in certain cases exceed the flow rates and/or pressures generated by the actual generator.

In other words, using the generator operating continuously under nominal conditions (pressure P1, flow rate D1), the present invention relates to control means for producing oxygen during a period t at a pressure P2 higher than P1, or during a period t' with a flow rate D2 higher than D1, optionally with a pressure P2 higher than P1.

According to the method of the invention, the generator operates continuously, and use is made, on the one hand, of a plurality of buffer tanks for storing the oxygen generated by the generator, which are placed in parallel, communicating at their inlet with the generator outlet, and at their outlet with an application consuming the oxygen produced, and on the other hand of a control system for at least adjusting the flow rate and/or the pressure of the oxygen produced to the demand in flow rate and/or pressure of the application.

This control system comprises at least one module for controlling the two buffer tanks, performing at least the following functions:

(a) the storage in one of the buffer tanks, called nominal tank, of a nominal oxygen reserve for maintaining, for a nominal period, an oxygen outlet pressure, called nominal measure, and/or an oxygen outlet flow rate, called nominal flow rate, (b) the storage in the other buffer tank, called peak tank, of an oxygen peak reserve, greater than or equal to the nominal reserve in terms of quantity, for maintaining, for a peak period, an oxygen pressure called pressure peak, which is higher than or equal to the pressure called nominal pressure, and/or an outlet flow rate, called peak flow rate, which is higher than or equal to the nominal flow rate, (c) according to the oxygen pressure demanded, which is higher than or equal to the nominal pressure, and lower than or equal to the peak pressure, and/or according to the oxygen flow rate demanded, which is higher than or equal to the nominal flow rate, and lower than or equal to the peak flow rate, an offtake at the outlet of the nominal tank and/or of the peak tank, (d) the control of the generator for generating and resupplying oxygen continuously to the nominal tank and/or the peak tank.

BRIEF DESCRIPTION OF THE DRAWINGS

For a further understanding of the nature and objects for the present invention, reference should be made to the following detailed description, taken in conjunction with the accompanying drawings, in which like elements are given the same or analogous reference numbers and wherein.

DESCRIPTION OF PREFERRED EMBODIMENTS

Figure 1:
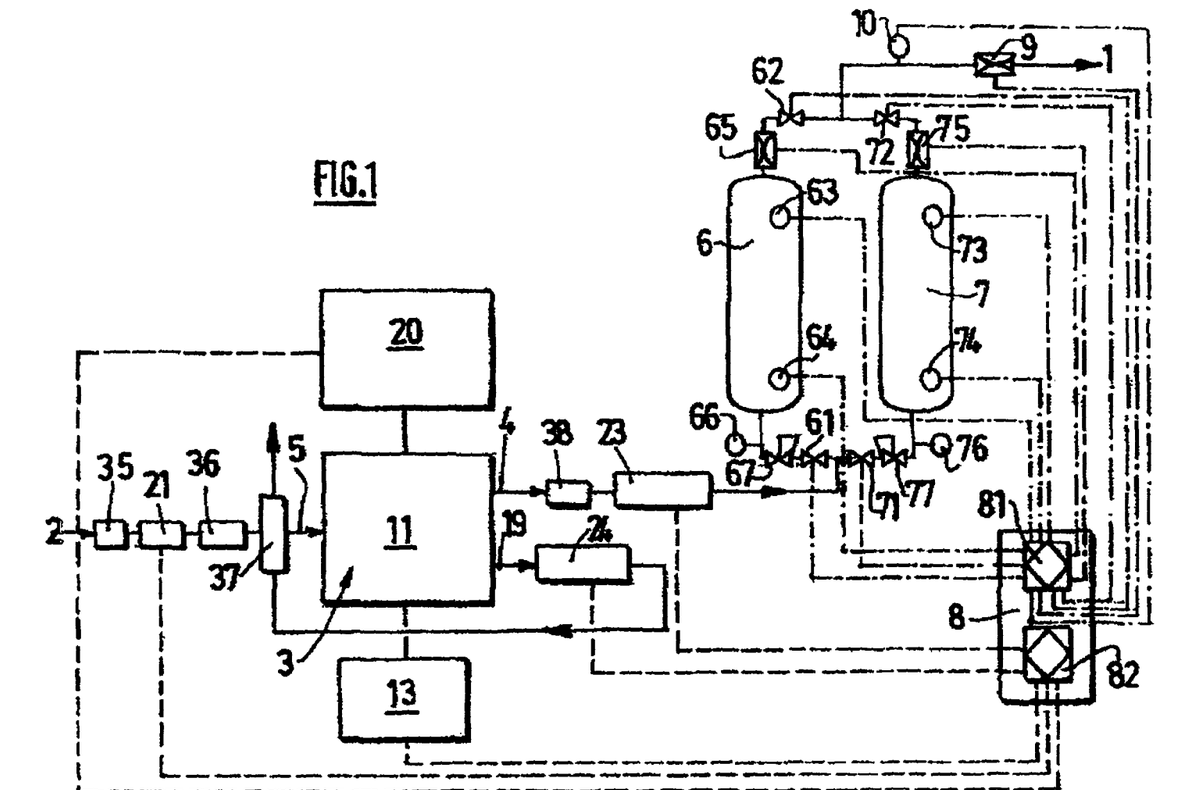
FIG. 1 shows a schematic representation of a complete oxygen production installation, operating according to a method, particularly a control method, of the invention.

According to FIG. 1, an installation according to the present invention essentially comprises:

a generator 3, generating oxygen at its outlet 4, from air introduced at its inlet 5; and various other components or circuits described below, associated with this generator, two buffer tanks 6 and 7 for storing the oxygen generated by the generator, placed in parallel, each communicating at their inlet with the outlet 4 of the generator 3, and each at its outlet with an application (9, 10) consuming the oxygen produced 1, and a control system 8, or controller, for, in general, at least adjusting the flow rate and/or pressure of the oxygen produced to the demand in flow rate 9 and/or pressure 10 of the application; this control system 8 comprises at least one module 81 for controlling the two buffer tanks 6 and 7, and a generator 3 control module 82, controlled by the module 81 for controlling the two buffer tanks 6 and 7.

On the whole, with the installation as shown in FIG. 1, oxygen (1), or an oxygen-enriched gas, which is pressurized, is produced continuously from air 2 introduced into the installation.

Figure 2:
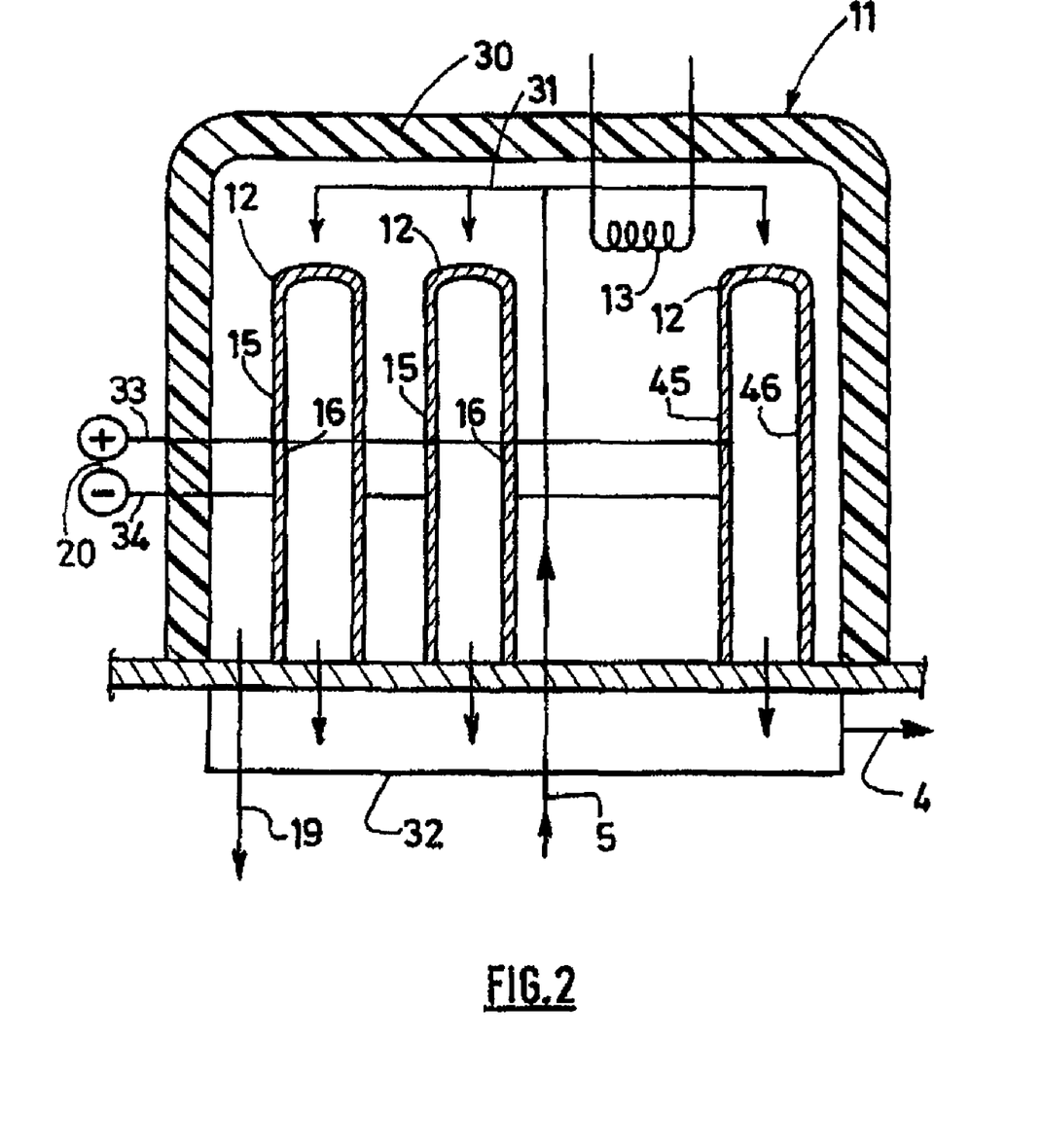
FIG. 2 shows a schematic representation of an electrochemical cell belonging to a generator comprised in the installation shown in FIG. 1.

As shown in FIGS. 1 and 2, the generator 3 is of the ceramic membrane type and comprises one or more electrochemical cells 11 for generating oxygen. Each electrochemical cell 11 comprises one or more ceramic membranes 12, each having the shape of a tube closed at one end, each placed between a cathode 15 and an anode 16. In operation, that is, at high temperature, an electric power source 20 is used to make an electric current, controlled in voltage and/or current, flow between the cathodes 15 and the anodes 16. The electrical connections for each tube extend from the internal anode 16 (positive terminal for an electrochemical generator) to the external cathode 15 (negative terminal for an electrochemical generator) of the next tube, etc; the generator is connected to an outlet connector 34 to the first tube by the external cathode, and to an outlet connector 33 to the last tube by the internal anode. All the ceramic membranes 12 of tubular shape are placed in a furnace 30 internally heated by any appropriate means 13, such as an electric resistor. The interior of the furnace is fed with air 5 by a distributor 31 outside the various ceramic membranes 12 in the furnace enclosure. The air is preheated in or outside the furnace. The oxygen produced is tapped off from the interior of the various ceramic membranes 12, to be collected by a manifold 32 and removed at 4. The oxygen-depleted air, constituting a waste 19, is removed from the interior of the furnace 11. In this way, each ceramic membrane 12 is supplied with air 5 from the cathode 15 side, and oxygen is removed 4 on the anode 16 side.

The generator 3 may comprise several electrochemical cells 11, either mounted in series, as shown in FIG. 2, and accordingly supplied by one and the same electric power source 20, or mounted in parallel, as not shown, and supplied respectively by a plurality of individual electric current sources.

Figure 3:
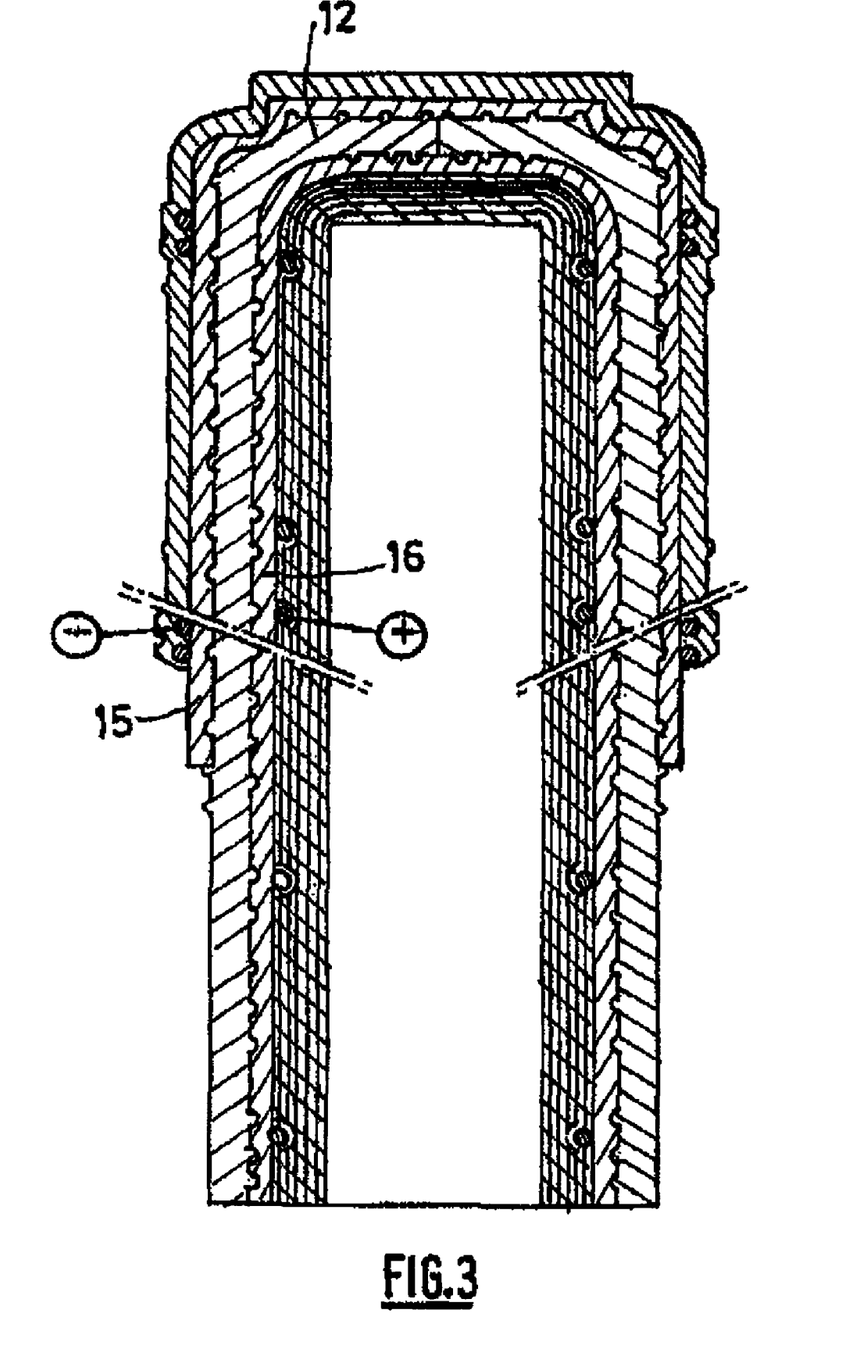
FIG. 3 shows more particularly a ceramic membrane belonging to an electrochemical cell as shown in FIG. 2, and schematically.

FIG. 3 shows, on a larger scale, and schematically, and in axial cross section, a ceramic membrane 12 belonging to an electrochemical cell 11 as described previously, shaped into a tube with a closed upper end and equipped with its cathode 15 and its anode 16, with appropriate contact wires and electrical collection.

As shown in FIG. 1, between the air inlet 2 and the generator 3 inlet 5, the following are placed in succession:

a fan 35,
means 21 for controlling or regulating the mass air flow rate,
a filter 36,
and a heat exchanger 37 with the discharge 19.

At the generator 3 outlet are placed:

on the outlet circuit 4 of the oxygen produced, to the buffer tanks 6 and 7, a filter 38, and means 23 for detecting the pressure at the oxygen concentrations, and on the discharge outlet 19 to the heat exchanger 37, means 24 for detecting the oxygen partial pressure or concentration.

The two buffer tanks 6 and 7 for storing the oxygen generated 4 in the generator 3 are placed in parallel, and each communicates at its inlet with the outlet 4 of the generator 3, and at its outlet with an application 1 consuming the oxygen produced, and is characterized, on the one hand, by means 9 for controlling the mass flow rate, and on the other, by means 10 for controlling the pressure of the oxygen produced, the said means being controlled by the user.

More particularly, each buffer tank 6 or 7 operates in "on/off" mode, whereby any variation in the outlet flow rate of such a tank results in a pressure variation in the tank. For this purpose, each buffer tank 6 or 7 is equipped with:

two valves, one inlet (61, 71) and the other outlet (62, 72) controlled by the control module (81), two pressure controllers (63, 64; 73, 74) framing the pressure in the tank, one (63, 73) high level and the other (64, 74) low level connected, to the control module (81), a mass flow controller (65, 75) at the outlet of the tank, controlled by the control module (81), a pressure sensor (66, 76) at the outlet of the said tank, connected to the control module (81), and an overflow (67, 77) at the inlet of the tank, for its resupply.

The module 81 for controlling the two buffer tanks 6 and 7, uses an appropriate operating system and programming to perform the following functions:

(a) the storage in one (6) of the buffer tanks, called nominal tank (6), of a nominal oxygen reserve for maintaining, for a nominal period, an oxygen outlet pressure called nominal pressure, namely P1, and/or an outlet flow rate called nominal flow rate, namely D1, (b) the storage in the other buffer tank, called peak tank 7, of an oxygen peak reserve, greater than or equal to the nominal reserve 6 in terms of quantity, for maintaining, for a peak period, an oxygen outlet pressure called peak measure, namely P2, which is higher than or equal to the pressure called nominal measure, namely P1, and/or an outlet flow rate, called peak flow rate, namely D2, which is higher than or equal to the nominal flow rate, namely D1, (c) according to the oxygen pressure demanded, namely P, fixed or displayed on the sensor 10, which is higher than or equal to the nominal pressure P1, and lower than or equal to the peak pressure P2, and/or according to the oxygen flow rate demanded, displayed or fixed on the flow controller 9, which is higher than or equal to the nominal flow rate D1, and lower than or equal to the peak flow rate D2, an offtake at the outlet of the nominal tank 6 and/or of the peak tank 7, (d) the control of the generator 3, by means of the control module 82, associated with the module 81, for generating and resupplying oxygen continuously to the nominal tank 6 and/or the peak tank 7.

The module 81 for controlling the generator 3, depending on the module 82, controls at least one of the following operating parameters:

the mass flow rate of air feeding the ceramic membrane or membranes 12, using the flow controller 21, the electric current 20 flowing between the anodes 16 and the cathodes 15, in terms of voltage and/or intensity, the heating temperature of the ceramic membrane or membranes 12, using the heating means 13.

The control module 82 of the generator 3 also controls the generator according to the oxygen concentration, downstream of the anode 16, using the analyser 23, and/or the oxygen concentration of the discharge 19, downstream of the anode 16, measured by the analyser 24.

Thanks to the means defined above for controlling the generator 3 in relation to the buffer tanks 6 and 7, an oxygen product 1 of greater than 99% purity can be obtained, and/or with a pressure of between 1 and 50 bar.

According to a preferred arrangement, the module 82 for controlling the generator 3 controls at least one of the following default parameters of the generator 3, that is:

the air-feed flow rate, controlled by the controller 21, the electric power of the source 20 delivered between anode 16 and cathode 15, the heating, by the means 13, of the ceramic membrane 12, the oxygen pressure on the cathode side 15, the oxygen purity on the anode side 16.

The performance of an oxygen production method according to the invention can be illustrated with reference to the graphs in FIGS. 4 to 7, by selecting as operating parameter, and hence as controlled variable, the strength of the electric current 20 flowing between the anode 16 and the cathode 15 of the generator 3.

Figure 4:
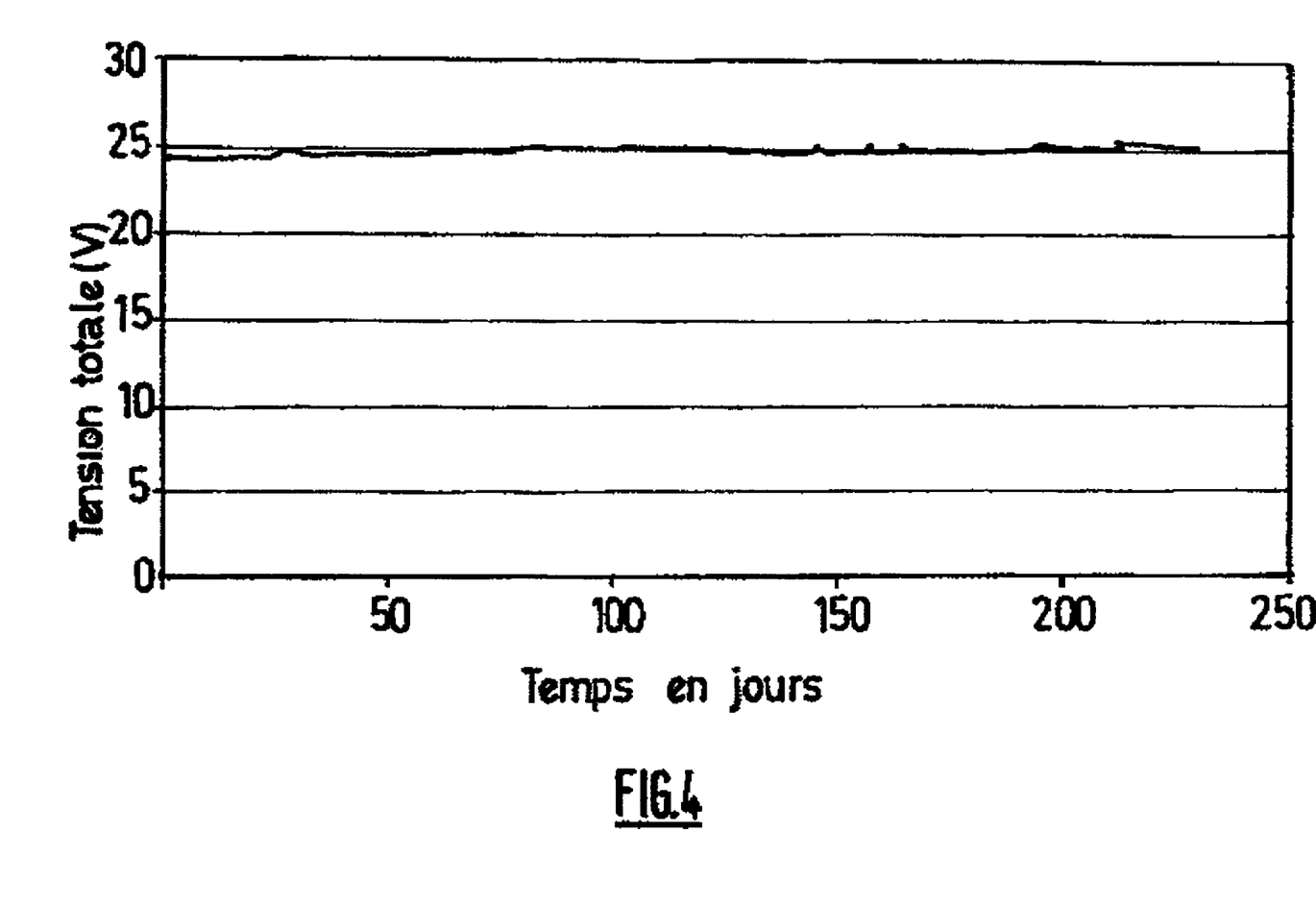
FIG. 4 is a graph of voltage versus time using a flow rate of 1 Sl/min at a pressure of 10 bar with a purity of 99.9999%.

According to FIG. 4, tests were conducted over more than seven months, while producing a flow rate of 1 Sl/min at a pressure of 10 bar with a purity of 99.9999%. According to FIG. 5, a stability of the voltage is observed over at least 250 days, with a flow rate degradation of less than 1%.

Figure 5:
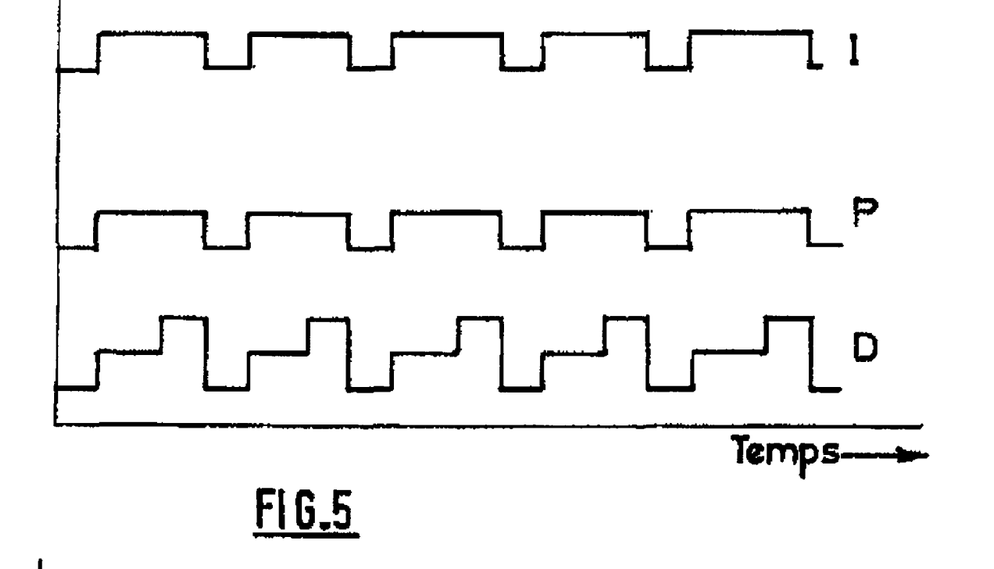
FIG. 5 is a graph of the flow rate of oxygen produced, the pressure of oxygen produced, and the strength of the current flowing between the cathode and anode versus time where, during a period t, a user needs a peak consumption at a flow rate D higher than D1, but at a pressure P equal to the pressure P1.
Figure 6:
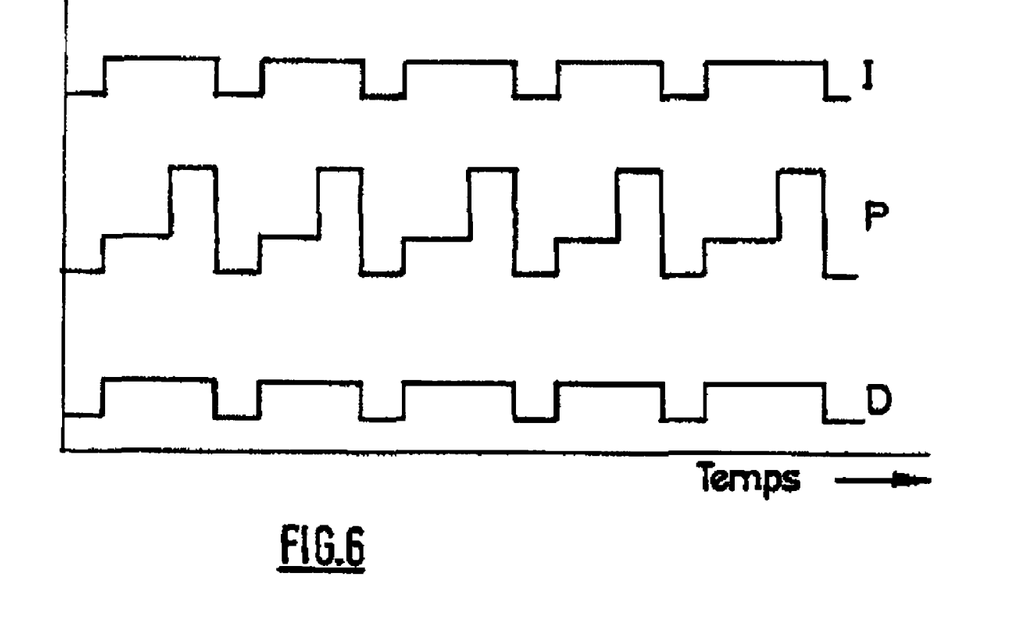
FIG. 6 is a graph of the flow rate of oxygen produced, the pressure of oxygen produced, and the strength of the current flowing between the cathode and anode versus time where, during a period t', a pressure P higher than P1, but at a flow rate D equal to D1.
Figure 7:
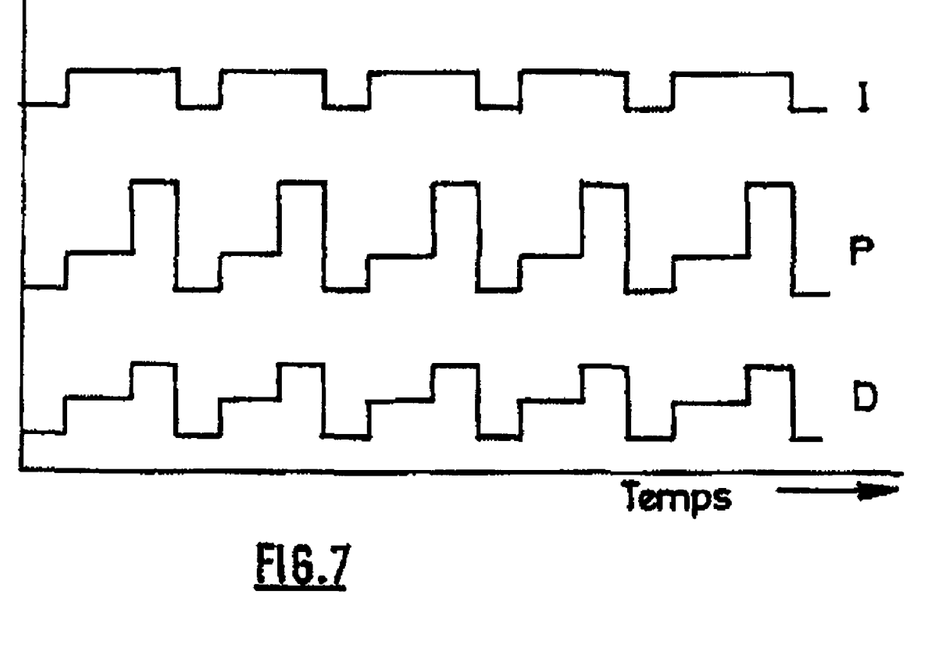
FIG. 7 is a graph of the flow rate of oxygen produced, the pressure of oxygen produced, and the strength of the current flowing between the cathode and anode versus time where the user occasionally consumes a flow rate D much higher than D1, and at a pressure P much higher than P1.

According to FIGS. 5, 6 and 7, the letters D, P and I respectively identify the flow rate of oxygen produced, the pressure of oxygen produced, and the strength of the current flowing between the cathode 15 and the anode 16.

With the same conventions as previously, FIGS. 5 to 7 show the various operating modes feasible with a method of the invention.

In FIG. 5, the user works with nominal consumption at a flow rate D1 and a pressure P1. During a period t, he needs a peak consumption at a flow rate D higher than D1, but at a pressure P equal to the pressure P1. The production of oxygen at pressure P2, equal to P1, and at flow rate D2 higher than D1, previously contained in reserve in the peak tank 7, then supplements the oxygen production of the nominal tank 6.

Another example of the flexibility of the method of the invention is shown in FIG. 6.

In this case, the user needs, during a period t', a pressure P higher than P1, but at a flow rate D equal to D1. The oxygen production accordingly comes exclusively from the peak reserve 7, the peak consumption having been previously defined.

According to FIG. 7, the user occasionally consumes a flow rate D much higher than D1, and at a pressure P much higher than P1; the peak tank 7 is then activated.

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

What is claimed is:

1. A method for producing oxygen or an oxygen-enriched gas from air or from an oxygen-lean gas, comprising the steps of:

continuously operating an oxygen generator having an inlet and outlet, wherein the air or oxygen-lean gas is introduced at the inlet and the oxygen is generated at the outlet;

storing the generated oxygen in at least first and second buffer tanks placed in parallel, each of the first and second buffer tanks having an inlet communicating with the generator outlet and having at outlet communicating with an application consuming the oxygen; and adjusting at least a flow rate and/or a pressure of the generated oxygen in response to a demand from the application in oxygen flow rate and/or oxygen pressure, said step of adjusting being controlled by a control system comprising at least one module that is adapted to perform the following functions:

maintaining a nominal amount of oxygen in the first tank sufficient for maintaining for a nominal oxygen outlet pressure and a nominal oxygen outlet flow rate for a nominal period of time;

maintaining a peak amount of oxygen in the second tank sufficient for maintaining a peak oxygen outlet pressure and a peak oxygen outlet flow rate for a peak period of time, the peak oxygen outlet pressure being higher than or equal to the nominal pressure, the peak oxygen outlet flow rate being higher than or equal to the nominal oxygen outlet flow rate, said functions of maintaining nominal and peak amounts being performed according to the oxygen flow rate and/or the oxygen pressure demanded by the application, the demanded oxygen pressure being higher than or equal to the nominal oxygen outlet pressure and lower than or equal to the peak pressure, the demanded oxygen flow rate being higher than or equal to the nominal oxygen flow rate and lower than or equal to the peak oxygen flow rate.

2. The method of claim 1, wherein each buffer tank operates in an on/off mode whereby any variation in the outlet flow rate of one of the tanks results in a pressure variation in that tank.

3. The method of claim 2, wherein each buffer tank is equipped with:
- an inlet valve and an outlet valve controlled by the control module;
- two pressure controllers framing the pressure in the tank, one high level and the other low level, connected to the control module;
- a mass flow controller at the respective tank outlet controlled by the control module;
- a pressure sensor at the outlet of the respective tank connected to the control module; and
- an overflow at the inlet of the respective tank for the resupply thereof.

4. The method of claim 1, wherein the control system comprises a generator control module controlled by the control module that is adapted for controlling the buffer tanks.

5. The method of claim 4, wherein the generator comprises at least one electrochemical cell for generating oxygen, the electrochemical cell comprising at least one ceramic membrane heated to high temperature placed between a cathode and an anode, the cell being fed with air on the cathode side and drained of oxygen on the anode side, the generator control module controlling at least one of the following operating parameters:
- the mass flow rate of air feeding the ceramic membrane;
- a voltage or intensity of electric current flowing between the anode and the cathode; and
- the heating temperature of the ceramic membrane.

6. The method of claim 5, wherein the generator control module also controls the generator according to an oxygen concentration downstream of the anode and/or an oxygen concentration downstream of the anode.

7. The method of claim 5, wherein the generator control module controls at least one of the following default parameters of the generator:
- a flow rate of the air or oxygen-lean gas fed to the generator;
- a level of electric power delivered between the anode and cathode;
- the heating of the ceramic membrane;
- a pressure of the oxygen on the anode side; and
- a purity of the oxygen on the anode side.

8. The method of claim 5, wherein the generator comprises a plurality of electrochemical cells either:
- mounted in series and accordingly supplied by a same electric power source; or
- mounted in parallel and supplied by a respective plurality of electric power sources.

9. The method of claim 1, wherein the generator is controlled such that the generated oxygen has a purity of greater than 99%.

10. The method of claim 1, wherein the generator is controlled such that a pressure of the generated oxygen is between 1 and 50 bar.

* * * * *